(12) United States Patent
Sturt

(10) Patent No.: US 8,315,350 B2
(45) Date of Patent: Nov. 20, 2012

(54) METHOD AND APPARATUS FOR HEAT PRODUCTION

(76) Inventor: Alan Charles Sturt, Surrey (GB)

( * ) Notice: Subject to any disclaimer, the term of this patent is extended or adjusted under 35 U.S.C. 154(b) by 831 days.

(21) Appl. No.: 11/921,544

(22) PCT Filed: Jun. 5, 2006

(86) PCT No.: PCT/GB2006/002047
§ 371 (c)(1),
(2), (4) Date: May 4, 2009

(87) PCT Pub. No.: WO2006/131712
PCT Pub. Date: Dec. 14, 2006

(65) Prior Publication Data
US 2009/0213975 A1    Aug. 27, 2009

(30) Foreign Application Priority Data
Jun. 4, 2005   (GB) .................................. 0511424.4

(51) Int. Cl.
*G21B 1/00*   (2006.01)
(52) U.S. Cl. ........................................ 376/108; 376/107
(58) Field of Classification Search .................. 376/107, 376/108
See application file for complete search history.

(56) References Cited

U.S. PATENT DOCUMENTS

| 4,172,008 A | * | 10/1979 | Fleet | 376/127 |
| 4,229,704 A | * | 10/1980 | Lewis | 315/500 |
| 4,347,621 A | * | 8/1982 | Dow | 376/139 |
| 5,729,580 A | * | 3/1998 | Millspaugh | 376/114 |
| 2001/0043663 A1 | * | 11/2001 | Ruth et al. | 376/195 |

FOREIGN PATENT DOCUMENTS

| DE | 33 22 606 A1 | * | 1/1985 |
| DE | 44 00 851 A1 | * | 6/1994 |
| GB | 1 426 983 | | 3/1976 |

OTHER PUBLICATIONS

Artsimovich, L.A., "Controlled Thermonuclear Reactions", Gordon and Breach Science Publishers 1964 (New York) (1964), pp. 1-16.*
Rose et al., "Plasmas and Controlled Fusion", M.I.T. Press 1961, pp. 17-20.*
Meade, D., "50 years of fusion research", Nuclear Fusion 50 (2010), 014004 (14 pp.).*

(Continued)

*Primary Examiner* — Johannes P Mondt
(74) *Attorney, Agent, or Firm* — Flynn, Thiel, Boutell & Tanis, P.C.

(57) ABSTRACT

A method and apparatus for producing heat is disclosed. The method involves the steps of accelerating one or more first particle(s) to a first velocity; colliding the accelerated particle(s) with one or more second particles in a collision zone located within a housing causing the first particle(s) and second particle(s) to form one or more collision mass(es) containing subatomic particles of the first and second particles; controlling the position of the collision mass(es) with electric and/or magnetic fields; and introducing one or more further particle(s) into the collision mass(es), the further particle(s) undergoing nuclear fusion with the one or more particles in the collision mass(es) producing fusion products and releasing heat.

24 Claims, 8 Drawing Sheets

OTHER PUBLICATIONS

Rosenbluth et al., "Generic issues fordirect conversion of fusion energy from alternative fuels", Plasma Physics and Controlled Fusion, vol. 36, pp. 1255-1268 (1994).*

Davidson et al., "Survey of collective instabilities and beam-plasma interactions in intense heavy ion beams", Nuclear Instruments and Methods in Physics research A, vol. 606, pp. 11-21 (2009).*

Translation into English of Mehlich, F. (DE 44 00 851 A1) preprared by the U.S. P.T.O Translations Branch.*

Denisov, "Superheavy element production, nucleus-nucleus potential and μ-catalysis", AIP Conference Proceedings AIP USA No. 704, 2004, pp. 92-101.

"Superheavy Element Production, Nucleus-Nucleus Potential and μ Catalysis", AIP Conference Proceedings AIP USA, No. 704, 2004—Abstract.

International Search Report dated Aug. 17, 2007.

* cited by examiner

METHOD AND APPARATUS FOR HEAT PRODUCTION

FIELD OF THE INVENTION

This invention relates to a method and system for the production or generation of heat by extracting the heat released when nuclei are fused together.

BACKGROUND OF THE INVENTION

There is a global need for an intensive source of energy which has security of supply, does not pollute and does not add to greenhouse gases. Such energy sources comprise hot gases and liquids which may be used in processes for providing useful outputs. These include industrial or domestic heat for direct heating of materials as in metal extraction or in chemical reactions or heating for buildings. These energy sources may also be transformed into kinetic energy through engines and the generation of electricity, which may be more convenient for some applications such as motors and vital for others such as lighting and electronic apparatus.

Intensive sources of energy currently in use are derived from fossil fuels or nuclear power stations. Fossil fuels are not always found where they are needed, so that they require transportation in bulk around the globe. They produce energy by combustion which always makes greenhouse gases because it is a chemical reaction. Chemical reactions occur at the level of electrons in atoms. By contrast nuclear power depends on the re-arrangement of atomic nuclei with the release of heat. There are essentially two main types of reaction: fission of large unstable nuclei, and fusion of light nuclei. Nuclear fission depends on critical masses of dangerously radioactive fissionable material. As a result it is inherently suited only to the generation of electricity in massive installations. The chain reactions involved require elaborate, expensive control systems to prevent run-away reactions resulting in a meltdown. The entire installation is contaminated with radioactivity, some of which may last for generations and even millennia. There are no known ways of accelerating the process of radioactive decay.

More satisfactory in principle than nuclear fission is nuclear fusion, in which nuclei of light elements such as hydrogen are caused to fuse to form larger stable nuclei such as those of helium. The fusion reaction releases vastly more energy than fission, the input materials are abundant and the products are potentially harmless. However, extremely high temperatures are necessary for fusion to occur, and it may even be necessary to use nuclear fission explosions to obtain enough heat to initiate the process of nuclear fusion. Even if conditions are reached which may be suitable for fusion, say in a plasma, the temperatures are so high that the reactor or torus may be badly damaged. To extract heat, it is necessary to keep the reactants from direct contact with the walls of the vessel by elaborate engineering.

Nuclear fusion occurs naturally in the Sun and heat is produced predominantly by the conversion of hydrogen to helium, which gives a present composition of 74% hydrogen, 25% helium by mass and only the smallest traces of higher elements. Helium has a nucleus so stable that it is known as an alpha-particle. Heat is generated on the formation of the helium nucleus as the vibration of the new configuration of nucleons, which is another form of kinetic energy. Energy is also emitted in various forms as light, for example ultraviolet light, X-rays, visible light, infrared, microwaves and radio waves. Energy is transmitted to nearby atoms and nuclei, adding to their vibration, and increasing their temperature.

The very small proportions of elements with higher atomic mass in the Sun shows that these elements are much more difficult to produce. They are thought to originate in super-nova explosions which reach very much higher temperatures than the Sun, far too high to reach in an apparatus on Earth. The fusion of hydrogen nuclei to form helium nuclei is essentially the product of collision at high velocities, which is another way of describing temperature. High pressures in the Sun force particles close enough for any resulting vibration to be transmitted to the bulk of the gas, i.e., spreads the heat.

The formation of a helium nucleus from protons is a slow process requiring multiple collisions and astronomical times, so that it is less likely that it could be reproduced economically. There is, however, the possibility of producing helium from the collision of two deuterium nuclei, which occurs naturally. This would be a faster process and yield a greater output of energy, because half the work of fusion is already done. However, the nature of the process is that only one collision is possible, because a hot helium nucleus would not be able to absorb any other nuclei to continue fusion. It would become a hot helium atom and lose its kinetic energy by warming up surrounding gases and the wall of the reactor. The other candidate, tritium, does not occur naturally, and the collision of two tritium nuclei would also be a single event, as would be the collision of, say, a deuterium nucleus with a tritium nucleus. Moreover, the stoichiometry of the reactions suggests the possibility of forming radioactive by-products. However, the introduction of a few tens of grammes of tritium into the plasma of a torus has been shown to produce a significant temperature rise.

SUMMARY OF THE INVENTION

The invention is defined in the appended claims to which reference should now be made.

Preferable features are defined in the dependent claims.

In one embodiment, a process for the generation of heat by the fusion of light atomic nuclei is disclosed. The fusion of light nuclei according to embodiments of the invention takes place inside the product of collision, herein called the collision mass, of a heavy ion with a heavy particle, ion, plasma or atom at velocities which are comparable to, or a fraction of, the speed of light.

Fusion temperatures are obtained by the collision in a collision zone of one or more heavy ions travelling at speeds which are substantial with respect to the speed of light, with target heavy ions or atoms. Embodiments of the present invention have the advantages that no radioactive material is produced, and the atomic species used in the process are readily available. Only small quantities of reaction materials are reacting in the process at any one time, and so there is no possibility of a runaway reaction. The problems of controlling large quantities of material at very high temperatures are avoided. The plant is not contaminated by radioactivity and toxic waste and so it can be decommissioned at the end of its life in substantially the same way as other industrial plant. There is no cost of very long term storage of radioactive waste and plants, such as arises from nuclear fission reactors. It is an advantage of the present invention that high temperatures are obtained and fusion occurs without the possibility of macroscopic damage to the apparatus. It is a further advantage of the process of this invention that it is fail-safe, because if the stream of heavy ions fails, the process stops.

Embodiments of the invention use input materials which are readily available, does not produce harmful by-products, does not use or produce radioactive materials and does not add to greenhouse gases.

BRIEF DESCRIPTION OF THE DRAWINGS

Embodiments of the invention will now be described in detail by way of example only with reference to the accompanying drawings, like reference numbers indicating like features, in which.

DETAILED DESCRIPTION OF THE PREFERRED EMBODIMENTS OF THE INVENTION

Figure 1:
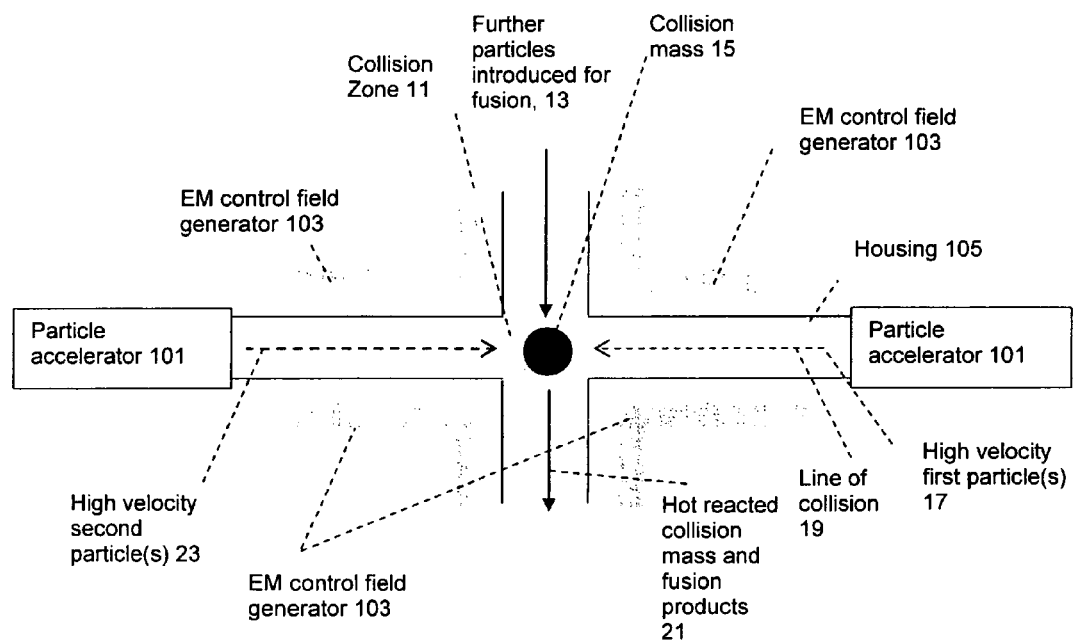
FIG. 1 is a schematic diagram showing the formation of a single collision mass of nuclear dimensions by the collision of two ions, preferably heavy ions travelling at a velocity close to the speed of light.
Figure 2:
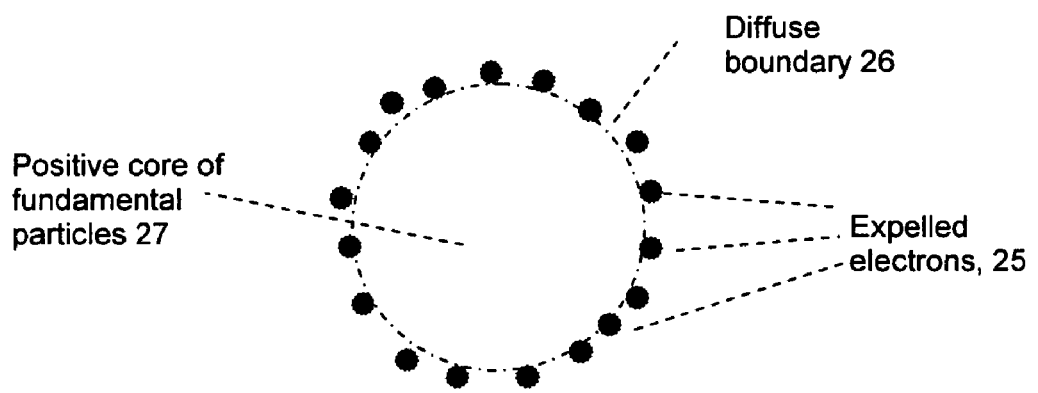
FIG. 2 is a schematic diagram in two dimensions of a single collision mass formed by the collision of two ions at a velocity close to the speed of light.
Figure 3:
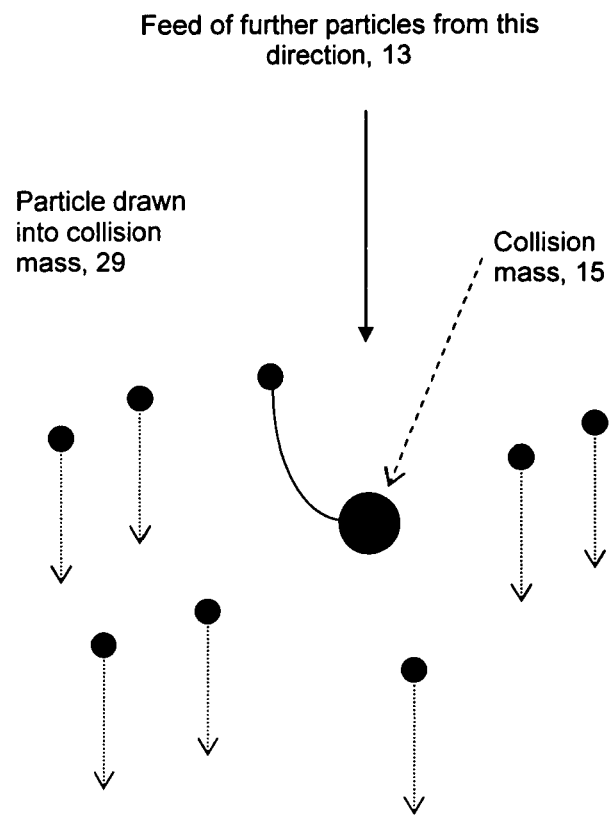
FIG. 3 is a schematic diagram of the capture of an ion, atom or molecule by the collision mass.
Figure 4:
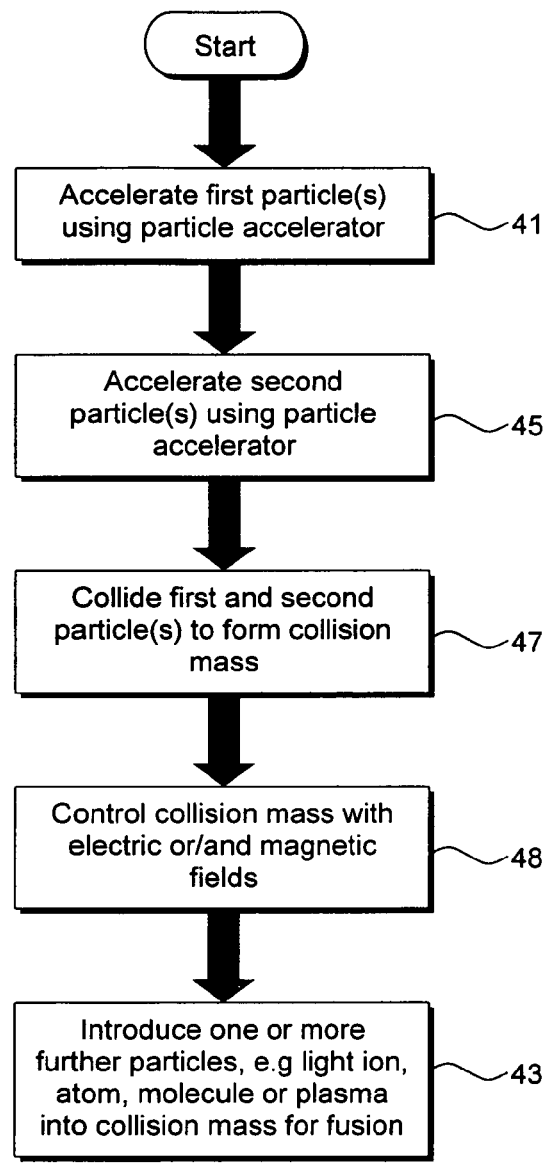
FIG. 4 is a flow diagram of the thermonuclear heat generation process.

Referring to FIGS. 1-3, and the flow chart of FIG. 4, a particle accelerator 101 or other accelerator is used to accelerate one or more first particle(s), preferably ion(s) or heavy ion(s) 17 to a first velocity with a high speed component which is preferably a speed comparable to the speed of light, step 41. This is performed under a partial vacuum.

The accelerator 101, or a second accelerator, is also used to accelerate one or more second particle(s), preferably ion(s) or heavy ion(s) 23 to a second velocity with a high speed component which is preferably a speed comparable to the speed of light, step 45. Once again, this is performed under a partial vacuum.

The trajectories of the two accelerate particles is arranged such that when the particles meet in a collision zone 11, the directions of the velocities of the first and second particle(s) are substantially opposite. Therefore the target second particle(s) 23 takes the form of one or more particle(s) 23 with a high speed and a direction opposite to that of the direction of the other first particle(s) 17. Preferably both particles have a speed which is comparable to the speed of light, to increase the impact of collision.

The particle(s) 17 is then collided in the collision zone or colliding section (collider) of the apparatus with the second one or more second particles 23, 10 preferably a heavy particle 23 to form a coherent entity or collision mass, 15. The collision zone is located within a housing allowing the trajectories of the particles to be controlled by electromagnetic (EM) fields. These EM fields may comprise electric or magnetic fields or both, and are generated by EM control field generators 103. Furthermore, a partial vacuum is maintained within the housing so that particles can be accelerated and collided without interference from unwanted particles. The partial vacuum is maintained by vacuum pumps (not shown) known to those skilled in the art.

The collider is the section of the apparatus in which the collision takes place. This is shown as the collision zone 11 in FIG. 1. This can be the part of the apparatus where the two accelerated particles collide.

Where opposing particles collide, both particles comprise ions 17, 23 so that they can be accelerated using a particle accelerator 101 along a line of collision 19 using techniques known to those skilled in the art, for example using electromagnetic fields, steps 41, 45. Both particles can be accelerated using a single accelerator and then fed into the collision zone at the appropriate time or, alternatively, two accelerators can be used so that each particle is accelerated by its own accelerator.

Particle accelerators which may be used are those capable of accelerating particles to velocities preferably greater than a third of the speed of light. Suitable accelerators are linear accelerators and synchrotrons, in which electric and magnetic fields accelerate and control streams of ions. Successive stages of acceleration may be used, and one accelerator may provide the input for another. Such an arrangement may include a Van de Graaff electrostatic generator. Ions progressively lose more electrons as they pass through the stages of acceleration. The greater the mass of the ion, the lower the speed needed to produce a suitable collision mass, which requires less capital investment and running costs.

When the accelerated particles are, for example, streams of ions or single ions, synchrotrons with intersecting storage rings and facilities for reversing flows can be used. Particles may pass through several stages of boosters before reaching storage rings, such as a linear accelerator, a booster synchrotron or an alternating gradient synchrotron individually or in series. Particles maybe injected from the storage rings as required for collision at points where the rings cross. This allows the particles to collide, and provides complete control over the entire process of heat generation.

The energy of collision of two particles 17, 23 depends on the momentum of the particles, which is proportional to their mass and velocity. It is their change of momentum on impact which smashes the structure of the ions. A range of particles may be used in the collision stage to produce optimum properties for engineering and physics. Examples of heavy atoms or ions which may be used as the first and second particles are copper, gold, platinum, silver, uranium, lead and iron. Rare earths (elements of the lanthanide series of the periodic table with atomic numbers from 57 to 71 inclusive) may also be used. The ions need to be easy to make and stable enough to accelerate to the desired velocities. Elements with an atomic number greater than argon (atomic number 18) may be suitable for the collision process. An important criterion is the nature of the collision product, which needs to be coherent enough to attract light ions by gravitational and electrostatic attraction and also needs to be not excessively dispersed. Such coherent entities have already been obtained with copper, gold and lead. However, it may not be necessary to cause the complete disintegration of the particles to subatomic or fundamental particles to form a collision mass which is capable of producing fusion of absorbed light atomic species. It is desirable to produce fusion at as low a temperature as possible in order to limit the power needed to accelerate the ions. The energy input for acceleration increases hyperbolically as the ion approaches the speed of light. Much of the energy input is wasted as electromagnetic emissions, which does not affect the particle's kinetic energy. Thus even a small reduction in velocity can save a considerable amount of power input, as long it forms a collision mass which is coherent and hot enough to cause the fusion of particles, preferably light nuclei which enter it. The most energy efficient process is, therefore, to use the heaviest available ion at the lowest possible speed to achieve a collision mass capable of fusing particles which are introduced into it. Accelerating a particle to a velocity of about a third of the speed of light consumes only a few percent of the power needed to accelerate to velocities close to the speed of light. Then if two particles are collided with opposing velocities, each at a speed of a third of the speed of light, the effective speed of one of the particles viewed from the reference frame of the other particle is approximately 0.6c, where c is the speed of light, using relativistic addition of velocities. This is enough to promote fusion of some light nuclei such as tritium when they are subsequently introduced (for example injected or fed) into the collision mass. These particles may be controlled by electric or magnetic fields or both so that they can be introduced into the collision mass. The collision mass does not have to destroy the light nuclei, but simply nudge them into a new configuration. Another advantage of a lower velocity is that it facilitates the orientation of trajectories, which is important for arranging collisions. The following description refers to the first and second particles being heavy ion(s). However, other particles maybe used as previously described.

Each collision of one or more first and second heavy ion(s) produces a collision mass 15 with a high temperature, step 47. Collision masses are the loci for the fusion of further particles 13, preferably light nuclei. If the colliding particles are of equal mass and velocity, their momenta cancel out, and the entities formed by collision are comparatively stationary in the collision zone 11. If, however, one of the particles has a lower velocity or is stationary at the instant of collision, the momentum of the high velocity heavy ion is imparted to the whole collision mass 15. Further description of the nature of the collision mass is given in the attached appendix, to which reference should now be made.

Figure 5:
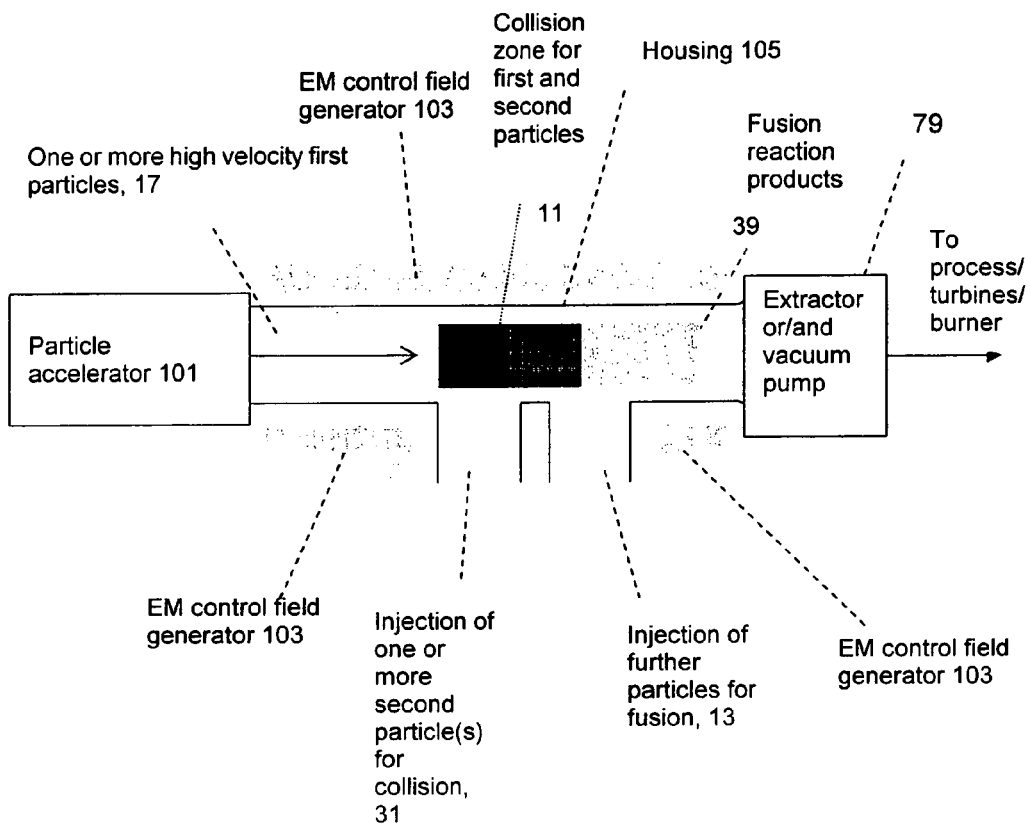
FIG. 5 is a schematic diagram showing the process for nuclear fusion according to a further embodiment of the invention using a single particle accelerator.

The residence i.e. the position of the collision mass (es) in the reaction chamber (housing) and lifetime of collision masses are controlled by choice of atomic number of the particles involved and the use of electromagnetic (EM) containment fields generated by an EM control field generator 103, step 48. These fields may comprise electric or magnetic fields or both, and allow for the location of the collision mass within a housing 105 of the apparatus to be controlled, as well as for stabilising the collision mass. The control field generator 103 shown in FIGS. 1 and 5 is in schematic only. Those skilled in the art will appreciate that the actual coils and plates necessary to provide the containment fields will be located inside the housing 105 needed to contain the particle (s) accelerated under a partial vacuum. Furthermore, containment fields may be located above and below the collision mass 15, and these are not shown in the Figures for clarity. The housing 105 containing the partial vacuum and containing the collision mass are known to those skilled in the art. It may comprise metal, for example stainless steel tubing, joined together for example using nuts and bolts or/and welding. The force of collision of the one or more first and second particles at velocities which are comparable to the speed of light is sufficient to reduce them to more fundamental particles for example quarks, which cluster together to form a coherent collision mass, as shown in FIGS. 1 and 2. The collision mass may also contain one or more protons or/and neutrons. The collision mass is maintained in the collision zone by the use of electric or magnetic fields or both generated by the EM control field generator 103. The collision mass has a surface of expelled electrons 25 which occupy a diffuse boundary 26 between the core 27 and the outside. At the surface are electrons 25 which have been displaced by the energy of the collision, because they are mobile. The core, 27, which contains by far the largest proportion of the mass, comprises substantially fundamental particles of which nuclei, protons and neutrons are composed, for example quarks. The positive charges in the core may be more evenly distributed.

Therefore, the collision mass is a coherent entity with a mass which is approximately equal to the combined masses of the colliding heavy atomic species, but substantially devoid of atomic and nuclear structure as a result of the energy of the collision. The entity has an effective temperature which may briefly approach that of stellar bodies.

However, collision is in part a random process, and so most first particle(s) 17 pass the second particle(s) 23 without colliding, and so is therefore preferable to use a stream of particles to form one or more collision masses. A stream (plurality) of first ions (rather than a single ion) 17 is preferably accelerated using the particle accelerator 101 and this stream is then preferably incident on a plurality (stream) of second particles, ions, or heavy ions 23 with a velocity which is substantially opposite in direction to that of the first stream of particles. The advantage of using streams of particles or ions is that there is a greater probability of collision of two particles.

In one embodiment, the stream of particles or heavy ions comprises many millions of particles to achieve a sufficient number of collisions to generate useful heat. This represents a very small mass of material, because a kilogram contains many billions of heavy ions, which limits the possible extent of any damage to the surrounding apparatus.

Further description of the quantities of reactants needed in order to produce heat according to embodiments of the invention is given in the attached appendix, to which reference should now be made.

If streams of particles or heavy ions are collided with either an opposing stream of particles, heavy ions or a stationary particles or heavy atom, ion or particle, the collision masses form in the collision zone 11 as a cloud or "gas". Collision masses remain separate from each other during the process because of electrostatic repulsion.

The collision mass forms a cloud because collisions between particles from each stream of particles occur at slightly different locations which leads to a cloud of collision masses. The collision masses are distributed randomly in the cloud of collision masses situated in the collision zone, and each collision mass is of roughly nuclear dimensions and with extremely high temperatures for a short time.

Particles which do not collide continue out of the reaction zone and play no further part except that, for the sake of economy, they may be recycled back into an earlier stage of the process.

Nuclear fusion is defined in the Encyclopaedia of Applied Physics as the amalgamation of a projectile and a target nucleus to form another nucleus. According to this definition, the formation of a collision mass is not nuclear fusion, because a collision mass does not have a unique mass and is not the nucleus of a recognised element of the Periodic Table. As an unstable entity it degenerates into smaller entities, which may become recognised nuclei.

The collision mass (es), formed by the collision of two heavy ions is heavy enough to form an entity with sufficient mass and charge to pull the raw materials for fusion into its interior by gravitational and electrostatic attraction. These materials are injected or introduced 13 into the collision zone, 11. This collision mass is a miniature sun or "fireball". The charge of the collision mass allows it to be controlled and stabilised by electric and magnetic fields 48 so that it can act as an individual nuclear furnace for fusion reactions. It is held in the collision zone by these electric or/and magnetic fields long enough for one or more further particles, preferably light particles 13 (e.g. ions, atoms, molecules or plasma of low atomic number) to be injected or introduced (fed) into the collision (reaction) zone 11, step 43 where one or more of the further particles are drawn into 29 the collision mass by electrostatic and gravitational attraction.

Appropriate particles 13 may also comprise protons, which undergo thermonuclear fusion to helium nuclei. This is analogous to the proton-proton reaction which generates the heat of stars, although other fusion reactions may be used. Light ions, atoms or molecules may be mixtures as required by the stoichiometry of the fusion reaction.

Light ions, atoms and molecules are generally those with atomic numbers less than that of argon which has an atomic number of 18. Hydrogen, deuterium, tritium and lithium are particularly favourable for absorption by the collision mass and nuclear fusion. The most reactive and least likely to produce radioactivity is deuterium. Light ions, atoms or molecules may be fed separately or mixed in stoichiometric proportions as appropriate for nuclear fusion. Input energy may be saved by cracking molecules, e.g., thermally, before injecting them into the fusion stage, which may facilitate absorption into the collision mass.

These particles 13 pass through the collision mass 15 or cloud of collision masses when these are at their hottest, step 43, and undergo tjsion with other particles which have entered the collision mass, for example light ions and release energy and heat. These particles 13 may also fuse with protons and neutrons originating from the heavy ions which have survived the collision and with the fundamental particles resulting from protons and neutrons destroyed in the collision.

The process of producing heat by nuclear fusion may be terminated at this point (after heat extraction via for example heat exchangers described later), or alternatively, additional further particles, preferably light ions etc. maybe introduced or fed into the collision zone. A proportion 29 of the additional further particles are drawn into the collision mass on a random basis by electrostatic and gravitational attraction, together with fragments of heavy ions from other collisions, as shown in FIG. 3. Once the further particles have been drawn into the collision mass, they undergo fusion with the fundamental particles inside the collision mass and release heat. The zone of attraction of a collision mass is much greater than nuclear dimensions because of these electrostatic and gravitational forces.

The release of further fusion energy further increases the temperature of the collision mass(es) 15. The heat of fusion in the form of the vibration of the nucleons of the resulting fused products, for example, a helium nucleus spreads to the rest of the collision mass in which it forms, and raises the temperature of the collision mass. This allows more particles, for example, light nuclei to be pulled into the collision mass to fuse and generate heat, if required. This succession of fusions ensures that the output of energy from the process is greater than the input. By this process, each heavy nucleus which takes part in a collision may give rise to the fusion of many light nuclei.

Preferably in one embodiment, heat is generated by the fusion of light particles in many such collision masses forming a cloud or gas of collision masses. The cloud of collision masses are contained and stabilised by electric and magnetic fields.

Even if one collision mass is formed or a cloud of collision masses is formed, the thermonuclear reaction is controlled by regulating the feed rate of further particles, preferably light particles 13. This may be continuous or intermittent.

Methods of feeding the further, preferably light particles 13 are known to those skilled in the art and are not shown in the Figures, and comprise thermal evaporation and laser techniques, or a stream of plasma. Laser beams can be used as concentrated heat sources to cause evaporation when they are applied to bulk materials.

If, however, a collision mass does not succeed in capturing light atomic species for fusion, it cools down, congeals into heavy ions again or mixtures of lighter ions, and becomes waste.

There is, however, a limit on the thermonuclear reaction that it produces inert species such as helium which dilute the collision mass.

After a succession of fusions inside a collision mass the quantity of inert species such as helium formed will dilute the reaction mixture inside the collision mass causing it to expand, reduce its temperature and so stop the fusion reaction so that no more fusion reactions can occur. This may be after a hundred or more fusions have taken place with the generation of proportionately large quantities of heat from a single collision of heavy ions. For that particular collision mass the process comes to and end, and it becomes effectively very hot gas. In this way it is possible to regulate fusion a few nuclei at a time.

The temperature increase produced by each collision and subsequent fusion of particles or elements is temporary and, so in one embodiment, a continuous process for manufacturing heat requires new collision masses to be produced. Therefore, it is preferable to use a stream of heavy ions so that new collision masses can be created using the accelerator. The process can be terminated at any instant by stopping the flow of the stream of particles, for example, heavy ions into the collision zone. The position of collision masses and the fusion products is controlled by electric or/and magnetic fields generated by the EM control field generator.

Preferably, in order to extract heat, the hot collision mass and fused particles may then evacuated using an extractor 79 for heat production. The extractor may simply comprise further electric or magnetic containment fields which progressively move the fusion reaction products along a housing 105 or tube which is surrounded by a heat exchange fluid so that heat can be extracted indirectly from the hot reaction products by extracting heat from the heated fluid surrounding the housing or tube using a heat exchanger. Alternatively a vacuum pump 79 can be used for heat extraction 21, step 56. The hot fusion reaction products can then be used directly as a source of heat or, alternatively, can be used indirectly to generate electricity via known methods.

In one embodiment, the creation of collision masses is a continuous process by colliding streams of particles. The bulk temperature of the collision masses is controlled by the flow of the collision masses through the feed of the further particles, preferably light ions, which then subsequently undergo fusion, and therefore increase the temperature of the collision mass. The streamlined flows are determined by the geometry of the reactor. The more further particles, for example, light species, which are fed into the collision mass, the more fusion reactions that will occur and the more heat will be released, up until the collision mass is cooled by the production of the helium by-product. Heat is extracted from such a bulk process either directly as hot gases or indirectly by heat exchange as previously described.

In this embodiment, the whole process is analogous to a chemical flow reactor, but with reactions at the nuclear instead of the electronic level. The same considerations of flow rates, residence times, heat transfer and separation techniques are applicable as in chemical engineering practice. The kinetics of the process depend on the probabilities of collision, numbers of ions, etc., just like the molecules of chemical reactions, because the streams are composed of billions of heavy and light ions. There is the possibility of back-mixing as well as plug flow and injection of plasmas of ions of the same or different species. Plug flow is where the reactants flow straight through the reactor and the reaction proceeds as the reactants travel through the reactor. Back mixing is where some of the reactants or resulting products are fed back into the input of the reactor. The stream of ions may also contain different constituent ions. Gases may be injected to improve the streamlining of flows, keep the high temperature plasma and gases from the walls of vessels, minimize losses and introduce chemical reactants to obtain specific effects. The process may preferably be continuous with electromagnetic control of flows, since the species are charged, but it may also be carried out as semi-continuous or batch reactions, which would produce heat in bursts.

The other feature of the process according to embodiments of the invention is that, since it has to be carried out in high vacuum, there is an extraction system in the form of vacuum pumps at the output end of the apparatus. This also serves to suck out the reaction products in the form of hot gases, either for direct use or through heat exchange.

FIG. 5 shows a schematic process for nuclear fusion according to a further embodiment in which fusion is achieved by colliding one or more first particle(s), preferably a heavy ion 17 from an accelerator with substantially stationary injected second particle(s), for example, heavy ions 31, atoms or plasma.

Referring to FIG. 5, a particle accelerator 101 or other accelerator is used to accelerate one or more first particle(s) 17, preferably an ion or heavy ion 17 to a high speed, preferably a speed comparable to the speed of light. This is performed under a partial vacuum. The first particle 17 is then collided in the collision zone 11 or colliding section (collider) of the apparatus with one or more second particle(s), preferably a heavy particle or ion 31, to form a coherent entity or collision mass, 15. This target second particle 31 is stationary or at a relatively low speed in the collision zone 11 in which the collision takes place. Preferably the first particle (s) have a speed which is comparable to the speed of light, to increase the impact of the collision.

The collider is the section of the apparatus in which the collision takes place. This is shown as the collision zone 11 in FIG. 5. This can be the part of the apparatus where the first accelerated particle(s) collide with the second substantially stationary particle(s).

This produces a collision mass with enough heat to cause the fusion of the subsequently injected further particles, preferably light nuclei 13. A stationary cloud of second particles, preferably heavy ions or atoms 31, can be formed from heavy elements by known techniques of gasification by hot wire and laser techniques, which give atomised or substantially atomised particles. This requires less energy than a stream of heavy ions, and allows optimisation of the concentration of heavy atoms in the cloud or gas to increase the chances of suitable collisions. The heavy atomic species and plasma for collision are injected 31 into the collision zone, 11 for heavy atomic species. The stationary cloud of heavy ions may also take the form of a plasma prepared separately and introduced into the collision zone to facilitate the fusion reaction. Preferably the first particles 17 comprise a stream of accelerated particles and these are incident on a plurality of second particles 31 which are substantially stationary in the collision zone 11.

This has the advantage of the increased probability of collision, which was explained with reference to previous embodiments. The position and lifetime of the collision mass can be controlled by electric or and magnetic fields generated by an electric or and magnetic (EM) control field generator 103 so the collision mass can be positioned in the housing 105 such that further particles can be introduced to undergo fusion in the collision mass.

The remaining the steps for the production of heat according to this embodiment are the same as those in the previous embodiment, and so will not be described in further detail. As in previous embodiments, a heat extractor 79 may be used in order to extract the hot fusion reaction products and collision mass. As in previous embodiments, the hot extracted products may then be used directly for heat production or indirectly to produce electricity. Alternatively, the heat extractor may comprise a heat exchanger to extract heat from the housing 105 without the need to remove the reaction products from the housing 105.

Figure 6:
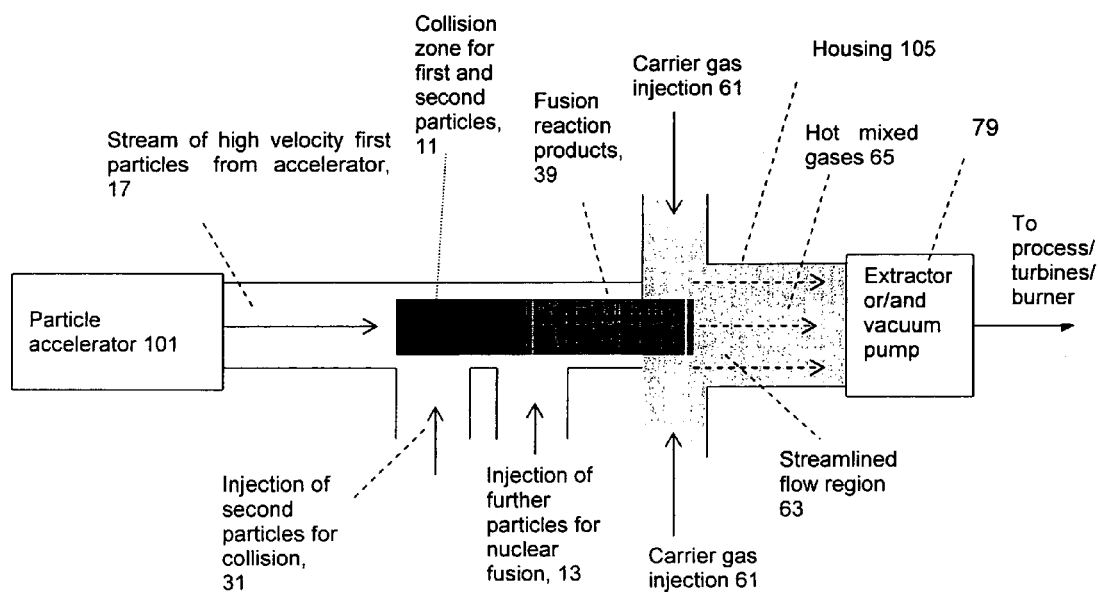
FIG. 6 is a schematic diagram showing the process of nuclear fusion according to an embodiment of the invention in which a carrier gas is further introduced.
Figure 7:
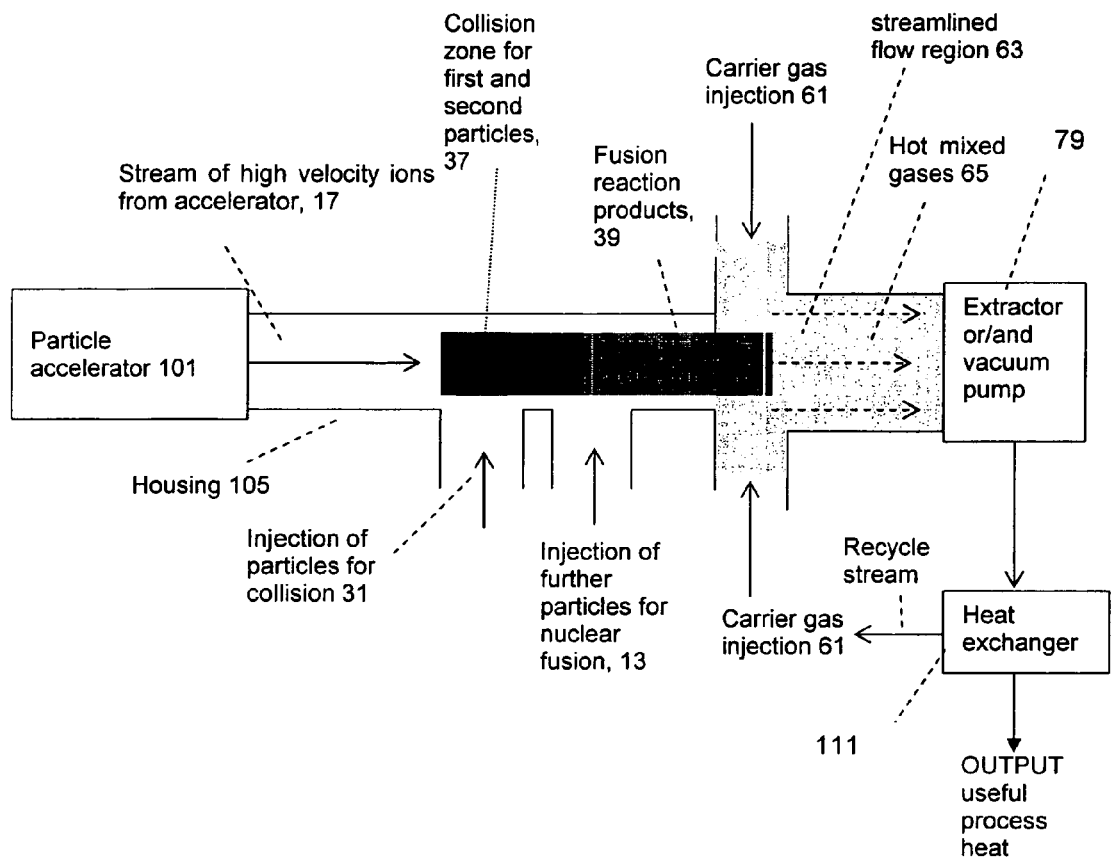
FIG. 7 is a schematic diagram of the embodiment of FIG. 6 further comprising a heat exchanger.

In all embodiments, it is preferable to use a stream of a (carrier) gas 61, such as hydrogen, helium or other species which is inert at the high temperatures produced by fusion, to sweep the hot plasma and gas of the collision mass out of the reaction zone to provide heat for industrial and other purposes. The heat can be converted into electricity or other energy using techniques known to those skilled in the art, for example turbines, and burners or heat exchangers. This is schematically shown in FIGS. 6 and 7. For clarity, in FIGS. 6 and 7, the EM control field generators are not shown.

The carrier gas may be injected 61 so as to form streamlines 63 so as to act as barriers between the hot fusion products and the walls of the apparatus (housing) 105. The streamlines allows controlled mixing 65 of the carrier gas and the fusion products and collision mass(es) so that they are further away from the walls of the housing. The carrier gas reduces the temperature of the fusion products, particularly near the walls of the housing 105. The carrier gas helps to reduce the corrosion of the walls of the housing and also reduces the corrosion of any extraction equipment for extracting the hot collision mass and fusion products. The carrier gas may also be added tangentially to form a vortex into which hot fusion products are sucked and in which they are contained so as to prevent contact with the walls of the housing 105. The carrier gas 61 mixes 65 progressively with the hot gases of reaction in a streamlined flow 63 as it moves along the tube and reduces their temperature to a bulk temperature suitable for extraction by vacuum pumping apparatus 79. The carrier gas may be injected as streamlined flows immediately after the port through which light atomic species are injected for fusion, as shown in FIGS. 6 and 7. There may also be an advantage in using at least a proportion of hydrogen in the carrier gas, because hydrogen is the most efficient neutron moderator. Although no radioactive materials are required as inputs into the processes according to embodiments of the invention, there is a small possibility that some of the thermonuclear reactions may produce a few ancillary neutrons, though reactions would be preferred which avoid this. If any neutrons are produced, hydrogen from the collision product would reduce any potentially harmful effects. Hydrogen in the carrier gas would enhance this.

There is a possible additional operation after that to inject electrons by electrodes to neutralize residual protons and assist the formation of hydrogen gas.

After the extraction/vacuum pump, there are two possibilities as shown in FIGS. 6 and 7.

In one embodiment, the hot output gases may be collected into a reservoir or used directly in other processes. If the carrier gas is hydrogen, this may be used to drive turbines and burnt as a fuel to complete the extraction of energy.

Alternatively, in a further embodiment, the hot output gas may be pumped through a heat exchanger 111 to extract heat, and then recycled and injected back into the process as carrier gas, as shown in FIG. 7. It may be particularly advantageous to use helium as a carrier gas because it is less corrosive at high temperatures. An additional process would remove hydrogen from the recycled stream as the economics required.

The processes of forming collision masses according to the embodiments by collision with stationary targets and collision of opposing streams are not mutually exclusive. It may be advantageous to use the collision of opposing streams in the presence of a cloud of atomic species or plasma injected into the collision area at the appropriate time. Light atomic species are introduced into the reaction zone in which collisions have occurred or are still occurring while the temperatures in the collision masses are high enough to cause fusion of the light nuclei. The reaction chamber is the section of the collider in which collision takes place with additional ports as necessary for injection of light ions, atoms or molecules and exhaustion of products. The reaction chamber is equipped with electric and magnetic fields for stabilisation of the collision products to keep them in position. The kinetics of heat production depend on the statistical probabilities of collision followed by absorption from streams of light ions. In the absence of direct observation, which is a feature of all bulk nuclear reactions, the simplest method of control is by measuring the temperature of the output. Similarly the number of collision masses formed from opposing streams will be a small proportion of the number of ions in each stream. To generalize, processes which depend on statistical probabilities are most easily controlled by feedback from output to input, in this case from temperature to rates of flow of ions, atoms and molecules. This is comparable with the situation in industrial and laboratory chemical processes, where analysis of outputs is used to follow the progress of reactions. The extraction of the hot ion and gas output stream from the fusion process is by the technique similar to that used to connect storage rings and divert flows in accelerators. Any residual heavy ions can be separated by the same sort of magnetic field techniques used in mass spectrometry. Hot plasmas and gases may be cooled to temperatures suitable for engineering purposes by diluting with gases, the flow of which may be directed to keep the high temperature stream from the walls. Storage systems may be used to smooth the flow of heat output. The hot gases can then be used as an input into other processes either directly or after heat exchange. They may be used to drive turbines or generate superheated steam which is used to drive turbines, as for the generation of electricity. Such electricity may be used to produce ambient temperature hydrogen for processes or distributed power generation, as in fuel cells. Hot gases may be used directly in the smelting of ores, or passed through heat exchangers to produce process heat for oil, chemicals and metallurgical processes. A whole complex of different processes may be fed from a thermonuclear heat generation plant. It may be particularly advantageous to dilute the plasma or gas from the storage vessel with hydrogen, because the output from the fusion reaction is likely to be largely hydrogen with a small proportion of helium. The entire output of hot gas may then be used directly in a burner to provide heat and dispose of waste product together with the production only of water, i.e., no greenhouse gases. Alternatively the inert gas nitrogen may be used as diluent, and simply vented to air after it has done its job. The total process of thermonuclear heat generation requires a substantial quantity of electricity to start up, and operate the accelerators and ancillary equipment, but once going it can produce more than enough electricity for its own purposes because of the fusion reaction. Ultimately the process becomes self-sustaining, while at the same time being self-regulating.

Figure 8:
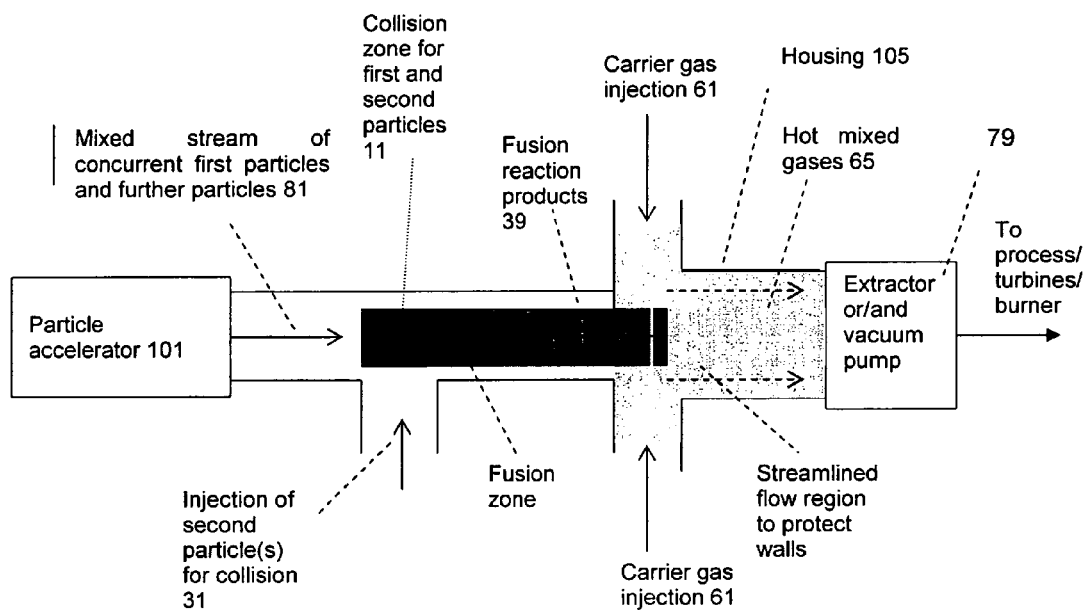
FIG. 8 is a schematic diagram of the embodiment of FIG. 6 in which both light ions for fusion and heavy ions for collision are introduced together travelling at a velocity close to the speed of light in the substantially the same direction, preferably but not necessarily using the same accelerator.

In a further embodiment, the further particles to undergo fusion in the collision mass, for example, light atomic species may also be accelerated using a particle accelerator or other device to a high velocity in the same direction as the first particles 81. The further particles or light ions can be accelerated using the same accelerator used for accelerating the first ion or ions used to form the collision mass. A mixed high velocity stream of concurrent ions for collision and further ions such as light ions for fusion are accelerated 81 in the accelerator. Alternatively, a separate particle accelerator can be used. This embodiment is illustrated in FIG. 8.

When, for example, the heavy ions collide with one or more second particle(s) 31, for example, another heavy atomic species, to form a collision mass, the light ion is then already present to be drawn into the collision mass for fusion. This embodiment has the advantage that precision timing is not needed in order to inject the further particles needed for fusion at the appropriate time. Preferably, both the first accelerated ion and the further particles or ions needed for fusion in the collision mass are stored in the same storage ring of the accelerator. This has the advantage that less capital investment is needed because fewer accelerators are required. Once a collision mass has been created, the steps for the production of heat according to this embodiment are the same as in previous embodiments, and so will not be described in further detail.

This principle also works with a stream containing a mixture of light ions, for example a 50:50 mixture of hydrogen and deuterium. The hydrogen would generate protons which might not take part in fusion reactions and so would generate no heat, but would do no harm. They would probably each pick up an electron and emerge eventually as hydrogen gas.

Such mixtures maybe readily formed by fractional electrolysis, distillation, diffusion or absorption or a succession of these processes much more cheaply than high purity deuterium. The output of processes according to embodiments of the invention is particularly suited to isolating deuterium from water as electricity by electrolysis and as heat by distillation. In a further embodiment, the process need not be continuous. It could be carried out in batches, but this is likely to be less economic. It is possible to keep heavy ions circulating in storage rings before injection into the collision zone. This may facilitate timing, but it is likely to be more costly than the production and use of heavy ions as a single operation. Since the ions are destroyed by the collision, it may be advantageous to use a different species in each stream for economic purposes.

The schematic drawings show only the progress of successful collision masses through the system. Particles, for example heavy ions which do not collide, and atomic species which are sucked through by the extraction system can be readily separated for recycling into the process by use of their high velocity. Alternatively they may be recovered as raw material.

APPENDIX 1

A. The Nature of a Collision Mass

The temperature of a collision mass depends on the momentum of the two colliding particles. At least one of the particles has to be an ion because charge is the only way of achieving high particle velocities in apparatus, though there may be additional mechanisms in stars, such as explosions. Momentum is the mass of a particle i.e. its atomic weight multiplied by its velocity. The acceleration of a particle meets increasing resistance as the speed of light is approached, because an increasing proportion of input energy is dissipated in the form of electromagnetic radiation as velocity increases. It is only the residual proportion of input energy which contributes to the mechanical momentum of the particle. Since it is this mechanical momentum which counts in the collision process, the lower the velocity at which suitable collisions can be achieved, the better. The corollary is to use ions which are as heavy as possible at the lowest velocity which achieves the desired properties in the collision product.

The process of acceleration progressively strips off orbiting electrons from an ion, leaving a nucleus with a high positive charge, though there may remain some residual orbital electrons. The proposed model is that collision destroys any residual atomic structure and reduces the nucleons to fundamental particles form an entity, at least for a short time, rather than a scattering of fragments. This entity is the collision mass. It is this containment within a nuclear sized entity which produces the great concentration of heat manifesting itself as a very high temperature. In this sense the high temperature means very small particles moving at extremely high velocities. If protons are reduced to fundamental particles, there is no reason why neutrons should not also be reduced, and the likelihood is that they first decompose into protons and electrons, as they are known to do in a matter of minutes when liberated from nuclear structures. The protons formed by this decomposition would themselves be reduced to fundamental particles, but electrons produced by the decay of neutrons would survive as such because they are fundamental particles, and so irreducible.

There are three different possible models of the resulting collision mass:

a. the plum pudding model with electrons spread throughout a matrix, which must be positive b. the separation of charges with the electrons on the outside and c. the separation of charges with the electrons bunched together in the middle, surrounded by positive charges.

Since the collision mass is an entity, its outside and interior are different, and so the mix of charges in the plum pudding model is most unlikely. Equally improbable is the bunching of electrons at the centre, because electrons are mobile, and most likely to congregate at the surface, as in the atom. Thus the most probable outcome is a positive core surrounded by mobile electrons. This is shown in FIG. 2 of the accompanying drawings. It shows the extreme model of a collision mass with at least some protons and neutrons completely destroyed, but it may not be necessary to reach that stage to make a collision mass which is hot enough to cause the fusion of absorbed light nuclei, such as those from deuterium. This is potentially a more economic process, but it has to be balanced against any decrease in the number of fusion reactions which can take place in the collision mass caused by its premature disintegration. Nor does the collision mass need to comprise two complete heavy ions, because a sufficiently large and hot enough entity may form from large fragments of heavy ions, subject to the same caveat.

The nature of the collision mass affects the ease with which nuclei for fusion can enter the high temperature core. Deuterium as a positive ion may find it easier to be accommodated if electrons on the surface of the collision mass have time to re-position themselves to meet the incoming positive charge, and guide it in. In their absence the ion meets a very large positive charge from the core which repels. There is a case to be made that a neutral atom or an ion with a negative charge, which is quite possible, might be received more readily.

At some stage the collision mass becomes so distended with the helium nuclei produced by fusion that it can no longer support a temperature high enough for fusion to continue, and it begins to cool and dissipate as very hot gases. It is most unlikely that the initial heavy nuclei which collided would reform, because atomic structures have been completely obliterated. Nor would neutrons be likely to reform. The most likely outcome is that each proton would attract an electron as it reformed to make a hydrogen atom, which would react with another to form hydrogen gas. There will not be enough electrons to go round, because the number of neutrons was about the same as the number of original protons in the colliding atomic species, and so almost twice as many protons would be formed as there would be electrons. The balance might continue as protons until they picked up an electron, or they could be fed with electrons exogenously as an added process e.g. from an electrode. Either way the heavy atomic species would be transformed back to molecular hydrogen.

B. Quantities of Reactants

A gram atom contains the order of $10^{23}$ (10 to the power) atoms. This would be the number of atoms in 1 g of hydrogen, 2 g of deuterium, 4 g of helium, 64 g of copper, 197 g of gold or 207 g of lead. The fusion of this number of nuclei represents a very large quantity of energy. (A hydrogen bomb is said to contain no more hydrogen than would fill a moderately small balloon, which is of the order of a gram atom.) The Joint European Torus (JET) experimental fusion reactor contains less than a gram of hydrogen. The liberation of fusion energy over a long period according to the invention would therefore require remarkably small quantities of material as in the following very rough approximations:

Fusion of 2 g atom of deuterium at one fusion per collision mass needs 2 g atom of heavy ions to collide.

If only one ion in a thousand collides, fusion of 2 g atom of deuterium at one fusion per collision mass requires 2 kg atom of heavy material to accelerate.

At twenty fusions per collision mass, the fusion of 2 g atom of deuterium requires one twentieth of that, which is 100 g atoms of heavy material to accelerate.

If only 0.1% of deuterium feed enters a collision mass and is fused, the process requires 2 kg atom of deuterium.

On these assumptions, the release of the energy of fusion of 4 kg of deuterium requires 20 kg of lead. This would yield 4 g of helium and 20 g of hydrogen at a temperature approaching perhaps 10 million degrees. This could be diluted with hydrogen to 240 kg of hydrogen at 1000° K, or 5 million liters of hydrogen gas at Normal temperature and pressure (NIP).

The quantities to be handled per second would be about a hundred thousandth of these numbers i.e. inputs of less than a tenth of a gram of deuterium and half a gram of lead, to produce outputs of 2.5 gs$^{-1}$ (2.5 gram per second) of hydrogen at 1000° K, equivalent to 50 IS$^{-1}$ (50 liters per second) of hydrogen at NTP.

This provides an idea of the size of equipment required. At the output end it is not vast, because of the high temperature.

The invention claimed is:

1. A method for producing heat comprising the steps of:
accelerating one or more first particles to a first velocity;
colliding the accelerated first particles with one or more second particles in a collision zone located within a housing and causing the first particles and second particles to form a collision mass comprising subatomic particles of the first and second particles;

controlling the position of the collision mass with electric and magnetic fields;

introducing one or more further particles into the collision mass, the further particles undergoing nuclear fusion with particles in the collision mass to produce fusion products and release heat, each of the further particles having a lower mass than the mass of any of the first particles and any of the second particles; and injecting a carrier gas to mix with the fusion products and reduce the temperature thereof.

2. A method for producing heat according to claim 1 wherein the second particles are accelerated to a second velocity, and the first particles and second particles collide such that the directions of their velocities are substantially opposite to each other.

3. A method for producing heat according to claim 1 wherein the first particles and the second particles comprise ions.

4. A method for producing heat according to claim 1 wherein the second particles are substantially stationary.

5. A method for producing heat according to claim 1 wherein the first particle is accelerated to a speed of approximately one third of the speed of light.

6. A method for producing heat according to claim 2 wherein the second particles are accelerated to a speed of approximately one third of the speed of light.

7. A method for producing heat according to claim 1, wherein the further particles are accelerated to a velocity in a direction substantially parallel to the direction of the velocity of the first particles.

8. A method for producing heat according to claim 7, wherein the further particles comprise mixed species of particles.

9. A method for producing heat according to claim 1, wherein the first particles comprise a heavy particle or ion.

10. A method for producing heat according to claim 1, wherein the second particles comprise a heavy particle or ion.

11. A method for producing heat according to claim 10, wherein the heavy particle comprises at least one ion or atom of one or more of gold, platinum, silver, iron, lead and uranium.

12. A method for producing heat according to claim 10 in which the second particles comprise at least one ion, atom or plasma of one or more of gold, platinum, silver, iron, lead and uranium.

13. A method for producing heat according to claim 1, wherein the further particles comprise at least one light atomic specie.

14. A method for producing heat according to claim 13, wherein the at least one light atomic specie comprises one or more ions, atoms, molecules or plasma of hydrogen, deuterium, tritium, lithium, beryllium, boron, carbon, nitrogen and oxygen.

15. A method for producing heat according to claim 1, wherein the carrier gas is injected such that the temperature in the vicinity of walls of the housing is reduced.

16. A method for producing heat according to claim 1, further comprising the step of extracting the mixture of carrier gas and fusion product with an extractor.

17. A method for producing heat according to claim 1, wherein the collision mass comprises one or more of protons, neutrons and quarks.

18. A method for producing heat according to claim 1, wherein the further particles are introduced into the collision mass by injecting the further particles into the collision zone and the further particles are drawn into the collision mass by at least one of gravitational and electrostactic attraction.

19. A system for producing heat comprising:

an accelerator for accelerating one or more first particles to a first velocity;

a collider for colliding the accelerated first particle and with one or more second particles in a collision zone located within a housing and causing the first particles and second particles to form a collision mass comprising subatomic particles of the first and second particles;

an electric and magnetic control field generator for generating fields for controlling the position of the collision mass;

an injector for introducing one or more further particles into the collision mass to cause the further particles to undergo nuclear fusion with particles in the collision mass and produce fusion products and release heat, each of the further particles having a lower mass than the mass of any of the first particles and any of the second particles; and a carrier gas injector for injecting a carrier gas to mix with the fusion products to reduce the temperature of the fusion products.

20. A system for producing heat according to claim 19, wherein the accelerator further comprises a Van de Graaff generator.

21. A system for producing heat according to claim 19, wherein the accelerator comprises a synchrotron accelerator.

22. A system for producing heat according to claim 19, wherein the further particles are introduced into the collision mass by thermal or laser evaporation.

23. A system for producing heat according to claim 19, wherein the carrier gas injector is arranged such that the temperature in the vicinity of walls of the housing is reduced.

24. A system for producing heat according to claim 19, further comprising an extractor for extracting the fusion products from the housing.

* * * * *